(12) United States Patent
LaBelle

(10) Patent No.: US 6,333,687 B1
(45) Date of Patent: Dec. 25, 2001

(54) AUTOMATIC UNDERSPEED WARNING SYSTEM

(76) Inventor: Paul J. LaBelle, P.O. Box 10, Waverly, PA (US) 18471

( * ) Notice: Subject to any disclaimer, the term of this patent is extended or adjusted under 35 U.S.C. 154(b) by 0 days.

(21) Appl. No.: 08/434,919

(22) Filed: May 4, 1995

(51) Int. Cl.[7] .................................................. B60Q 1/54
(52) U.S. Cl. .................. 340/466; 340/463; 340/465; 340/468; 340/467; 340/479
(58) Field of Search ................... 340/464, 463, 340/466, 467, 468, 470, 471, 472, 479

(56) References Cited

U.S. PATENT DOCUMENTS

| | | | |
|---|---|---|---|
| 3,045,738 | 7/1962 | Lombardi | 340/466 |
| 3,500,091 | 3/1970 | Jones | 340/466 |
| 3,581,278 * | 5/1971 | Huffman | 340/466 |
| 3,691,525 | 9/1972 | McClellan, Sr. et al. | 340/464 |
| 3,790,932 | 2/1974 | Ridpath | 340/466 |
| 3,805,161 | 4/1974 | Bayhz et al. | 340/463 |
| 3,906,345 | 9/1975 | Bertolasi | 340/466 |
| 4,162,445 | 7/1979 | Campbell | 340/466 |
| 4,243,938 | 1/1981 | Bliven, II et al. | 340/467 |
| 4,368,427 | 1/1983 | Hayashi et al. | 340/464 |
| 4,800,377 | 1/1989 | Slade | 340/467 |
| 4,841,276 * | 6/1989 | Abel et al. | 340/466 |
| 4,843,370 * | 6/1989 | Milde, Jr. | 340/466 |

FOREIGN PATENT DOCUMENTS

| | | |
|---|---|---|
| 1801964 | 7/1970 | (DE) . |
| 2247533 | 4/1974 | (DE) . |
| 2175462A | 11/1986 | (GB) . |

* cited by examiner

*Primary Examiner*—Daryl Pope
(74) *Attorney, Agent, or Firm*—Larson & Taylor PLC

(57) ABSTRACT

An automatic underspeed warning system warns travelers following a vehicle when the vehicle is traveling below a predetermined reference speed. The system may utilize the vehicle's existing warning lights as the warning indicator. The system provides for selecting one of two alternate reference speeds, so that one reference speed may be selected during highway driving and a lower reference speed may be selected during city driving. A latch circuit ensures that the warning indicator will not be activated until vehicle speed has exceeded the reference speed and then drops below the reference speed, thus ensuring that the warning indicator will not be activated during stop-and-go traffic. An inhibitor ensures that the warning indicator will not be activated while either of the vehicle's turn signals are active. This feature is utilized when the system is installed on a vehicle where the warning indicator uses the same lights as the turn signals.

12 Claims, 4 Drawing Sheets

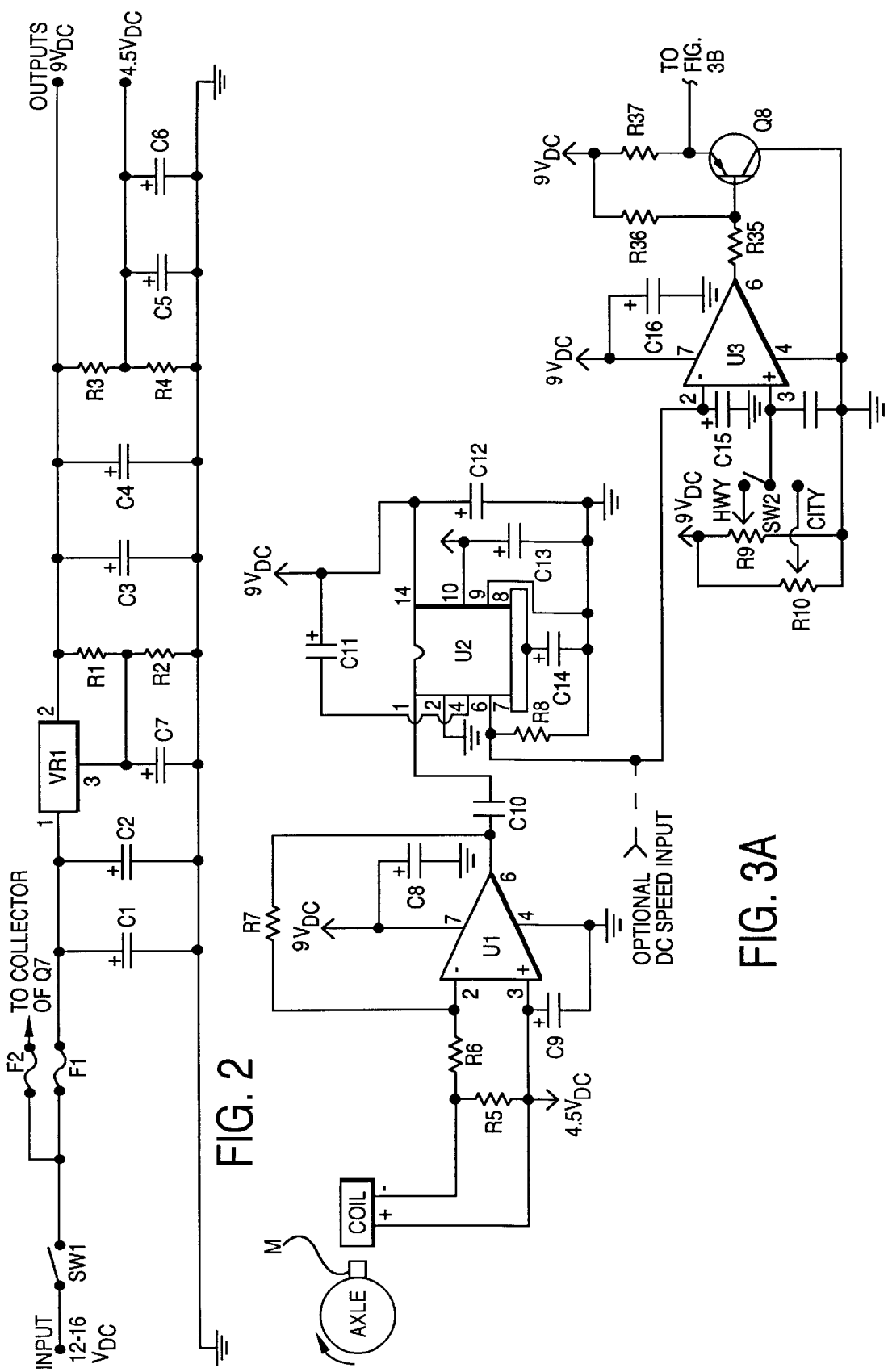

AUTOMATIC UNDERSPEED WARNING SYSTEM

BACKGROUND OF THE INVENTION

1. Field of the Invention

This invention relates to an improved system for warning travelers following a vehicle when the vehicle is traveling at a speed below a predetermined reference speed.

2. Prior Art

In certain situations, particular motor vehicles do not maintain the same speed as other motor vehicles on the roadway. This can occur, for instance, when heavy trucks climb a long incline on a highway without enough power to maintain highway speeds. Often in this situation, the truck operator will manually activate the flashing hazard lights or "flashers" to warn those following him that the vehicle is slow moving. Similarly, when a vehicle is slow moving due to disrepair or due to the operator purposely driving slowly to look for a particular street address, etc., the vehicle operator will often manually activate the flashing hazard warning lights to warn that the vehicle is slow moving.

The applicant is aware of several patents generally relating to the subject matter of this invention. U.S. Pat. No. 4,800,377, to Slade, discloses a system for actuating rear warning lights on a vehicle when the vehicle speed falls below a predetermined lower limit or threshold speed. Slade uses a magnetic pick-up to generate a pulsed signal correlating to the speed of the vehicle. This pulsed signal is compared to a reference pulse signal representing the threshold speed and, if the pulsed signal is below the reference signal, rear warning lights are flashed to warn those following the vehicle. The Slade patent provides a mechanism for enabling the operator to adjust the threshold speed if the vehicle is in slow speed conditions (city driving).

GB 2,175,462, to Hepburn, discloses a warning system that provides a visual warning whenever the vehicle is decelerating. The Hepburn patent also uses a pulsed signal to represent the speed of the vehicle.

U.S. Pat. No. 4,162,445, to Cambell, and U.S. Pat. No. 4,368,427, to Hayashi, both disclose digital speedometers. The Cambell patent uses optically generated timing pulses with a rate proportional to the rotational speed of the speedometer cable driver. The speedometer of the Hayashi patent includes a hysteresis processing circuit to improve the response of the system.

U.S. Pat. No. 3,691,525, to McClellan et al., discloses a speedometer wherein the vehicle speed is indicated to those located remotely from the vehicle through a series of lights mounted on the vehicle.

U.S. Pat. No. 3,790,932, to Ridpath, discloses a braking warning device for vehicles that is particularly adapted for snowmobiles and other vehicles that do not normally have brake lights. The Ridpath patent uses a variable output rotary generator for producing a voltage that is proportional to the vehicle speed. This voltage is compared with itself over time and is used to illuminate an external light when the vehicle is decelerating. A light is also illuminated when the speed of the vehicle falls below a predetermined rate.

U.S. Pat. No. 3,805,161, to Bayhz et al., discloses a system for sensing the speed of a motor vehicle. A pick-up coil device is used which generates an AC signal having a frequency related to the speed of the vehicle. The Bayhz et al. patent further discloses that the sensed speed may be used to provide a visual indication when a certain maximum vehicle speed is attained.

Most motor vehicles are operated in both low-speed environments (city driving) as well as high-speed environments (highway driving). While a device that automatically flashes warning lights whenever the vehicle speed is below a predetermined threshold speed is desirable in highway driving, it is often unwelcome and unnecessary in city driving when the vehicle is often being operated below the threshold speed. Thus, this is a drawback of the prior art.

A further drawback of the prior art systems is that on many vehicles, the turn signals utilize the same lights as the warning light system and when the warning lights are flashing, it is not possible for the driver to indicate a change of vehicle direction.

SUMMARY OF THE INVENTION

The present invention concerns an automatic underspeed warning system for motor vehicles that overcomes the drawbacks of the prior art systems described above when the systems are used with a vehicle employed for both city driving and highway driving.

According to a first aspect of the invention, the system is provided with a switch for selecting one of two alternative threshold or reference speeds (the speed below which the warning indicators are activated) so that one speed (e.g. 40 mph) may be selected during highway driving and a lower speed (e.g. 20 mph) may be selected during city driving.

According to a second aspect of the invention, the system can be reset so that, once reset, the warning indicators will not be activated until the vehicle first exceeds the reference speed and then falls below the reference speed. Thus, a vehicle may be operated at slower speeds (as in city driving), below the reference speed, without the warning indicators being activated, but once the vehicle attains the reference speed (as in highway driving), the warning indicators will be activated if the vehicle then slows below the reference speed.

As mentioned above, most prior-art systems utilize the vehicle's existing warning or "hazard" lights as the underspeed indicators, and this can be a problem when the driver activates his turn signals. The present invention provides a sensor for determining when the turn signals of the vehicle are activated and inhibits the activation of the warning lights during this time. This optional feature allows a driver to safely indicate to others that he is changing directions, or changing lanes.

The present invention also provides for two alternate methods of sensing the speed of the vehicle: either a magnetic-pick-up whose signal is amplified and converted to a DC signal, applicable to most vehicles, or a DC signal that is provided to a digital speedometer, applicable to vehicles having that capability. This allows the present invention to be easily adapted to modern vehicles wherein a DC speed signal is already provided.

Other features, and advantages of the present invention will be set forth in, or will become apparent from, the detailed description of the preferred embodiments of the invention which follows.

BRIEF DESCRIPTION OF THE DRAWINGS

FIG. 2 is a circuit diagram of the power supply and voltage regulation circuitry of the system of FIG. 1.

FIGS. 3A, 3B, and 3C together are a circuit diagram of the operational circuitry of the system of FIG. 1.

DETAILED DESCRIPTION OF THE PREFERRED EMBODIMENTS

Figure 1:
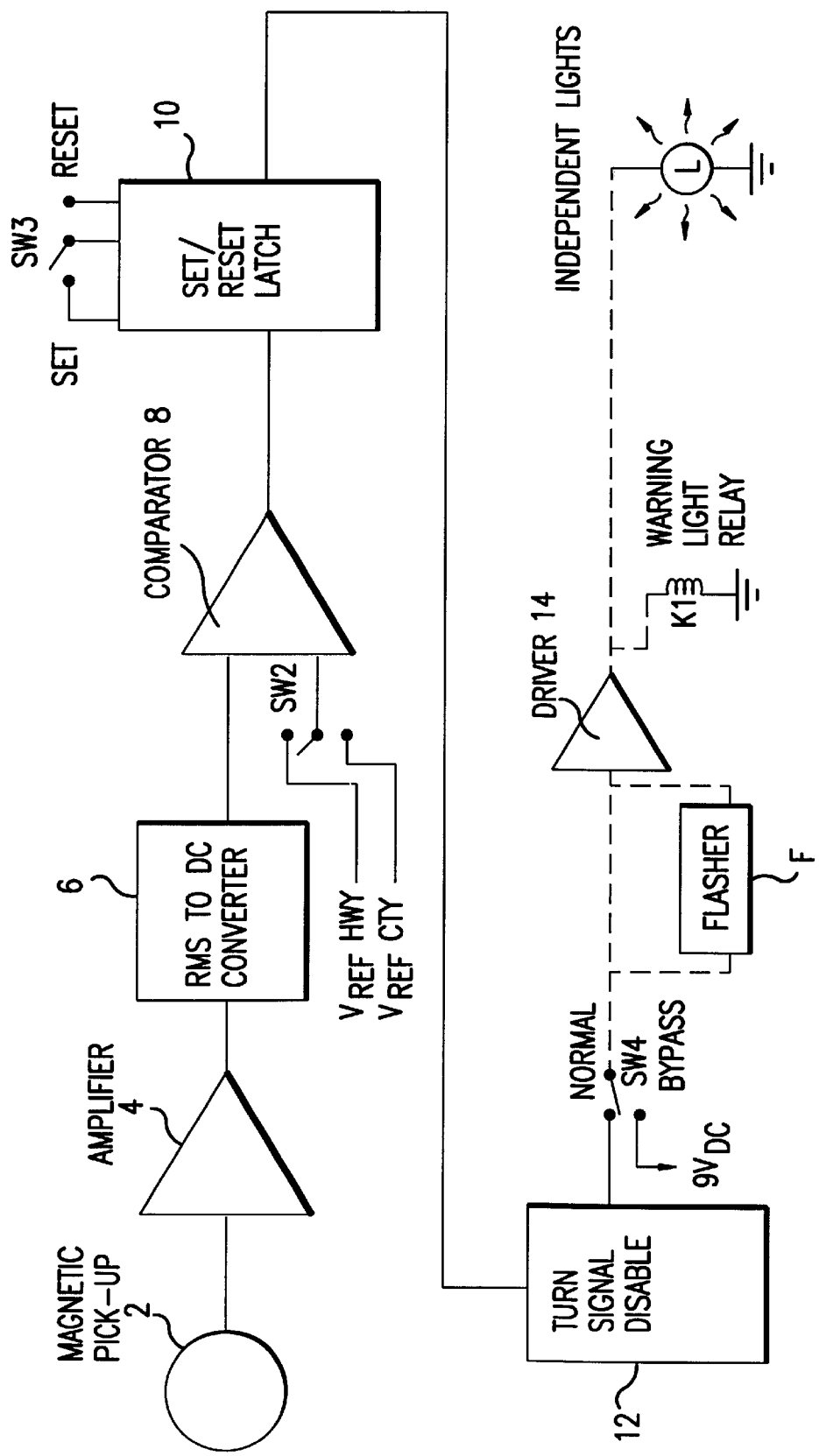
FIG. 1 is a block diagram of a preferred embodiment of the automatic underspeed warning system of the invention.

Referring to FIG. 1, the warning system of the present invention includes a magnetic pick-up 2 which provides a RMS signal that is proportional to the speed of the vehicle. This signal is amplified by an amplifier 4, converted to a DC speed signal by a RMS to DC converter 6, and is then compared to one of two alternate reference voltages by a comparator 8. The reference voltages are alternately chosen by a switch SW2. If the DC speed signal exceeds the reference voltage, an overspeed signal is output from comparator 8 and if the speed signal is below the reference voltage, an underspeed signal is output from comparator 8.

The output of comparator 8 is connected to a set/reset latch 10 which includes a set/reset switch SW3. Latch 10 uses the comparator output signal to determine whether the speed signal has exceeded the reference voltage since the last time switch SW3 was reset. If the speed signal has not exceeded the reference voltage since the last time switch SW3 was reset, set/reset latch 10 outputs a first inhibit signal. Otherwise, latch 10 outputs a first non-inhibit signal.

The output of set/reset latch 10 is connected to a turn signal disable means 12 which determines whether either of the vehicle's turn signals are active and outputs a second inhibit signal if either is active. If neither turn signal is active, turn signal disable means 12 outputs a second non-inhibit signal if the output signal from set/reset latch 10 is the first non-inhibit signal. Otherwise, turn signal disable means 12 outputs a second inhibit signal. The output of turn signal disable means 12 is connected through a bypass switch SW4 to driver 14 which drives a warning light relay K1 "on" whenever driver 14 receives a second non-inhibit signal from turn signal disable means 12. Warning light relay K1 activates the vehicle's existing warning or "hazard" lights.

Bypass switch SW4 allows the user to bypass the speed sensing circuitry and activate the warning lights at all times, if it is in the "BYPASS" position. Also, independent lights L may be utilized instead of the vehicle's existing warning lights by simply substituting them for relay K1, as shown. Flasher F may be utilized between bypass switch SW4 and driver 14 to provide flashing for independent lights L.

FIG. 2 shows the power supply and voltage regulation circuitry in accordance with a preferred embodiment of the present invention. The circuit is powered by the vehicle's 12 volt electrical power system through a switch SW1 and a fuse F1. The power supply for the invention is regulated and isolated from vehicular transients by a voltage regulator VR1 (National Semiconductor LM317T) and capacitors C1, C2, C3, C4, C5, C6, and C7 provide storage, noise reduction and ripple reduction. Resistors R1 and R2 provide necessary feedback and voltage division so that regulator VR1 outputs a stable 9 volt DC supply for the circuit elements. Resistors R3 and R4 are of equal values to provide a stable 4.5 volt DC reference voltage.

Figure 3B:
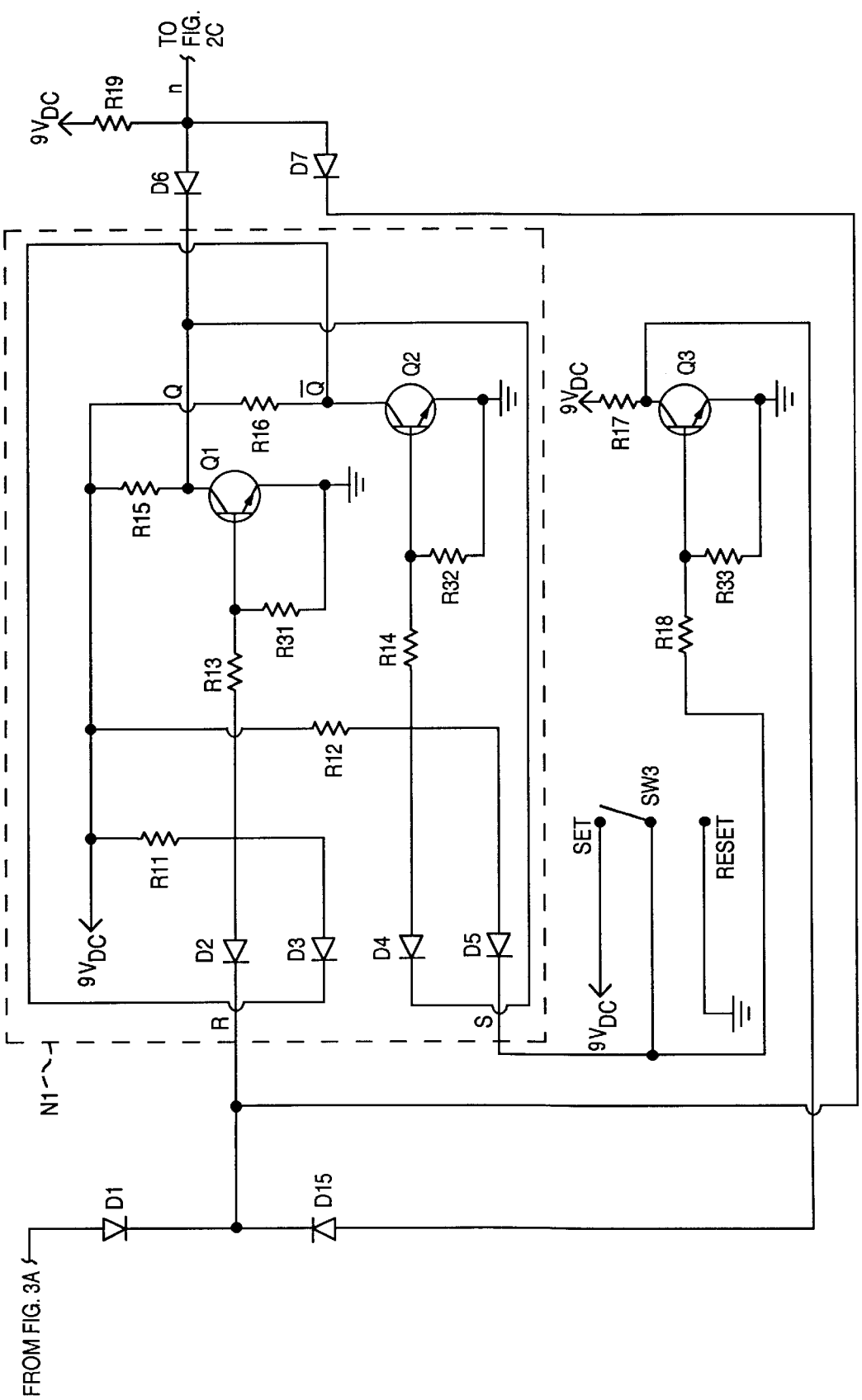
Figure 3C:
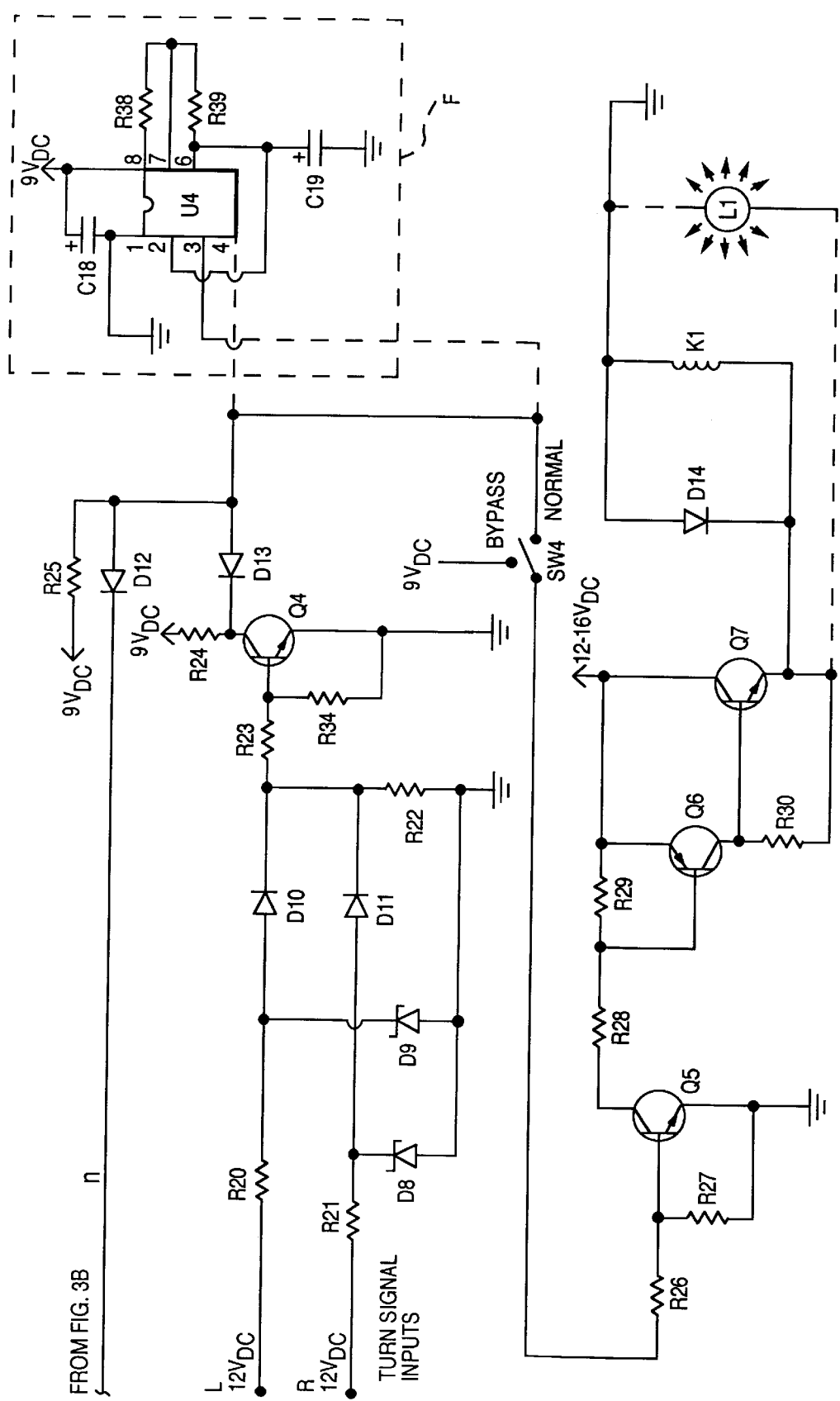

FIGS. 3A, 3B, and 3C show a preferred embodiment of the operational circuitry of the present invention. Referring first to FIG. 3A, the speed of the vehicle is sensed by a magnetic pickup system. Magnet M1 is mounted to a rotating drive element, such as the vehicle's final drive axle A1 and coil L1 is positioned nearby such that, as magnet M1 rotates past coil L1, a signal is induced in coil and the RMS value of the signal is proportional to the speed of the vehicle. This signal is referred to as the speed sensing signal.

The speed sensing signal is amplified by amplifier U1 (operational amplifier, National Semiconductor LM741). Resistor R5 is across the inverting and non-inverting terminals of amplifier U1 such that U1 is used in the single supply inverting configuration. A 4.5 volt DC reference voltage from the power supply is provided to the non-inverting terminal of amplifier U1 so that the speed sensing signal swings above and below the 4.5 VDC reference. Resistors R6 and R7 provide the necessary gain, while capacitors C8 and C9 provide further noise reduction. Amplifier U1 provides an amplified RMS signal to the input of RMS to DC converter U2 (AD536A) through non-polarized capacitor C10. RMS to DC converter U2 averages the RMS input signal by using averaging capacitor C11. Capacitors C12 and C13 are bypass capacitors for further noise reduction. Capacitor C14 is a post filter to reduce ripple and pulses at the output of converter U2. Resistor R8 provides a load for the DC output of RMS to DC converter U2. This DC output is the converted speed sensing signal and is, therefore, proportional to the speed of the vehicle. Capacitor C11 can be increased or decreased in value to vary the averaging time constant and provide a delay to the level of the DC output (DC speed signal). Thus, the vehicle speed may change quickly but the DC speed signal may be delayed to provide some hysteresis.

Once the amplified speed sensing signal has been converted to the DC speed signal, it is then compared to a reference voltage. The DC speed sensing signal is sent to the inverting input of comparator U3 (National Semiconductor operational amplifier LM741). A DC reference voltage which corresponds to the threshold speed (the speed below which the warning lights should flash), is supplied to the non-inverting input of comparator U3. Switch SW2 selects one of two alternate DC reference voltages to be supplied to U3. These DC reference voltages are set by potentiometers R9 and R10 and correspond to city and highway reference speeds. Thus, when the DC speed signal is less than the selected DC reference voltage, the output of comparator U3 is high (greater than 7 volts DC), and, when the DC speed signal is greater than the selected DC reference voltage, the output of comparator U3 is low (less than 2 volts DC). Capacitors C15, C16, and C17 are bypass capacitors for providing further noise reduction.

The output voltage from comparator U3 is used to drive PNP transistor Q8 open and closed, with resistors R35 and R36 biasing the emitter-base junction and limiting the base current. Resistor R37 limits the current through transistor Q8. A low output from comparator U3 allows the transistor Q8 to close and thus pull the emitter low (0 VDC). A high output from comparator U3 keeps the transistor Q8 open and thus the emitter is pulled high (9 VDC).

If the present system is installed on a vehicle that already has a direct DC output signal that corresponds to the speed of the vehicle, for instance, a car with a digital speedometer, then this signal can be input directly to the inverting input of comparator U3 (as shown in FIG. 3A), and magnet M1, coil L1, amplifier U1, and RMS to DC converter U2 can be eliminated.

Referring now to FIG. 3B, the output from the emitter of transistor Q8 is sent to a latching circuit, which serves as the reset means. Diodes D1 and D15 are switching diodes used to prevent feedback to the collector of NPN transistor Q3 and PNP transistor Q8, respectively. The NAND latch N1 comprises a pair of NAND gates and has the following truth table:

| R | S | O | COMMENT |
|---|---|---|---|
| 0 | 0 | * | Race |
| 0 | 1 | 1 | Set |
| 1 | 0 | 0 | Reset |
| 1 | 1 | NC | No Change | where the cathode of diode D2 is input R; the cathode of diode D5 is input S, the collector of PNP transistor Q1 is output Q and the collector of PNP transistor Q2 is output $\overline{Q}$. Diodes D2 and D3 provide the gating for an AND gate while resistor R11 acts as a current limiter for diodes D2 and D3. Transistor Q1 acts as an inverter to make the AND gate into a NAND gate. Resistors R13 and R31 provide the emitter-base bias and the base current limit to transistor Q1, and resistor R15 limits the current through the collector of transistor Q1. Diodes D4 and D5 provide the gating for a second AND gate and resistors R12, R14, R16 and R32, and transistor Q2 function similarly to resistors R11, R13, R15 and R31 and transistor Q1, respectively. Thus, together these elements comprise a second NAND gate.

Switch SW3, a momentary switch which is normally closed in the SET position, provides the reset capability while PNP transistor Q3 acts as an inverter that prevents the Race condition of the truth table. Resistors R18 and R33 provide the base-emitter bias and base current limiting to transistor Q3 and resistor R17 limits the current to the collector of transistor Q3. When switch SW3 is placed in the reset position, the collector of transistor Q3, which is connected to the cathode of diode D2 (input R), is pulled high.

Diodes D6 and D7 and resistor R19 are incorporated as an AND gate, where resistor R19 acts as a current limiter for the diodes. This AND gate ANDs the input R and the output Q of the NAND latch N1 so that both R and Q must be high to provide a high (9 VDC) output at signal n.

The NAND latch N1 operates in the following manner: Initially, switch SW3 is in the SET position, switch SW1 is in the open position, and R, S and Q are low (0 VDC). When switch SW1 is closed, power is provided to the circuit and S goes high (9 VDC). R may be either high, indicating that the DC speed signal is less than the DC reference signal, or low, indicating that the DC speed signal is greater than the DC reference signal. If R is high (9 VDC) then there is no change at the output of the NAND latch and Q remains low (0 VDC). Thus, signal n would be low. The first time the DC speed signal exceeds the DC reference signal at comparator U3, R goes low and Q goes high. This is the SET condition in the table above and signal n remains low. When the DC speed signal later drops below the DC reference signal then R goes high and Q stays high. Thus, signal n goes high. Signal n stays high until the DC speed signal exceeds the DC reference signal or until switch SW3 is momentarily moved to the RESET (grounded) position, pulling input S low (the RESET condition in the table above). Then, switch SW3 rebounds to its normally closed SET position. Once the RESET condition occurs, signal n stays low until the DC speed signal exceeds the DC reference signal and later drops below the DC reference signal.

If, when the power is initially provided, by closing switch SW1, the DC speed signal exceeds the DC reference signal (R is low), then Q goes from low to high and the SET condition from the table occurs. Thus, signal n is low.

It should be noted that switch SW3 may be automatically activated when a certain condition occurs, such as the vehicle coming to a stop or falling below a very low threshold speed, which would indicate that the vehicle is in stop-and-go traffic.

Signal n is then fed to a portion of the circuit that inhibits the activation of the warning indicator if either of the vehicle's turn signals is active. This portion of the circuit is shown in FIG. 3C. Signal n is fed to one input of an AND gate formed by diodes D12, D13, and resistor R25. The other input of the AND gate is fed by a NOR gate that outputs a low signal whenever either the left or right turn signal is active.

Left turn signal L and right turn signal R are fed through resistors R20 and R21, respectively, and zener diodes D8 and D9 lower the 12 VDC from the turn signals to 9 VDC for use in the circuit. The NOR gate is formed by diodes D10 and D11, resistors R22, R23, and R24, and transistor Q4. Diodes D10 and D11 form an OR gate and resistor R22 is used as a current limiter. PNP transistor Q4 is used as an inverter to convert the OR gate to a NOR gate. Resistors R23 and R34 bias the emitter-base junction of transistor Q4 and resistor R24 limits the current. Thus, if either turn signal is active, the AND gate formed by diodes D12, D13, and resistor R25, will output a low signal and the warning lights will not be activated.

The signal from the AND gate is then input to bypass switch SW4 which is used to bypass the underspeed warning circuit when the driver wishes to activate the warning lights at all times. From switch SW4 the signal is sent to a driver circuit made up of transistors Q5, Q6, and Q7, which drive the warning light relay K1. Resistors R26, R27, and R29 bias the emitter-base junctions of transistors Q5, Q6, and Q7 respectively. When the signal input to resistor R26 is high (9 VDC), it closes the emitter-collector junction of transistor Q5 which, in turn, closes the emitter-collector junction of transistors Q6 and Q7. When emitter-collector junction of transistor Q7 closes, it provides 12 VDC to the warning light relay K1 which activates the vehicle's existing warning light circuitry. When switch SW4 is in the bypass position, constant voltage is provided to the driver circuit.

If it is desired to use independent warning lights that are separate from the vehicle's existing warning lights, independent lights L1 may be connected from the emitter of transistor Q7 to ground, as shown. Flashing circuit F may be provided for lights L1 with the addition of timer U4 (National Semiconductor LM555) connected between the turn signal disable circuit and the driver circuit as shown. To utilize flashing circuit F, the signal from the AND gate formed by diodes D12 and D13 and resistor R25 would be input to timer U4 at pin 4 and the output from timer U4, at pin 3, would be input to switch SW4. The direct connection from the AND gate to switch SW4 would be eliminated. The output of the timer U4 toggles between high (9 VDC) and low (0 VDC) at a rate determined by resistors R38 and R39 and capacitor C19, whenever the input, pin 4, is high. A flash rate of approximately 2 hertz is preferable. In this situation, the connections to relay K1 and diode D14 may be eliminated if no utilization of the vehicle's existing warning lights is desired.

Also, the turn signal sensing portion of the circuit may be eliminated by simply inputing signal n directly to switch SW4.

Switch SW4 is shown as a bypass switch that allows the operator to bypass the speed sensing circuitry described above and to provide constant power to the driver transistors to activate the warning light circuitry at all times by simply moving switch SW4 to the BYPASS position. When switch SW4 is in the NORMAL position, the circuitry operates as described above.

Digital circuitry could be used for any of the discrete elements in the circuit of the device and, further, it is not necessary to concurrently utilize all of the described features of the device. For instance, bypass switch SW4, voltage reference switch SW2 and flasher circuit F could all be eliminated from the automatic underspeed warning circuit and the system would function accordingly, without those features.

Although the invention has been described in detail with respect to preferred embodiments thereof, it will be apparent to those skilled in the art that variations and modifications can be effected in these embodiments without departing from the spirit and scope of the invention.

I claim:

1. An underspeed warning system for a motor vehicle comprising:
   speed sensing means for outputting a speed sensing signal proportional to the speed of said motor vehicle;
   means for providing a reference speed signal;
   comparator means for comparing said speed sensing signal to said reference speed signal and outputting an underspeed signal when said speed sensing signal is less than said reference speed signal and an overspeed signal when said speed sensing signal is greater than said reference speed signal;
   at least one warning indicator;
   driver means for activating said at least one warning indicator in response to said underspeed signal;
   a reset switch; and
   latch means for inhibiting said driver means from activating said at least one warning indicator until said overspeed signal is output from said comparator means after the last activation of said reset switch.

2. An underspeed warning system for a motor vehicle as in claim 1 wherein said means for providing a reference speed signal comprises a reference speed switch for alternately selecting said reference speed signal from at least two predetermined reference speed signals.

3. An underspeed warning system for a motor vehicle as in claim 1 wherein said latch means comprises a NAND latch comprising a pair of NAND gates.

4. An underspeed warning system for a motor vehicle as in claim 1 wherein said speed sensing means comprises a magnetic pick-up system that outputs an RMS signal proportional to the speed of the vehicle.

5. An underspeed warning system for a motor vehicle having left and right turn signals, comprising:
   speed sensing means for outputting a speed sensing signal proportional to the speed of said motor vehicle;
   means for providing a reference speed signal;
   comparator means for comparing said speed sensing signal to said reference speed signal and outputting an underspeed signal when said speed sensing signal is less than said reference speed signal;
   at least one warning indicator;
   driver means for activating said at least one warning indicator in response to said underspeed signal; and
   turn signal disable means for inhibiting said driver means from activating said at least one warning indicator when at least one of said turn signals is active.

6. An underspeed warning system for a motor vehicle as in claim 5 wherein said means for providing a reference speed signal comprises a reference speed switch for alternately selecting said reference speed signal from two or more predetermined reference speed signals.

7. An underspeed warning system for a motor vehicle as in claim 5 wherein said speed sensing means comprises a magnetic pick-up system that outputs an RMS signal proportional to the speed of the vehicle.

8. An underspeed warning system for a motor vehicle having left and right turn signals and including a circuit for producing a direct DC speed signal proportional to the speed of the vehicle, said warning system comprising:
   means for providing a reference speed signal;
   comparator means for comparing said direct DC speed signal to said reference speed signal and providing a underspeed signal when said direct DC speed signal is less than said reference speed signal and an overspeed signal when said direct DC speed signal is greater than said reference speed signal;
   at least one warning indicator;
   driver means for activating said at least one warning indicator in response to said underspeed signal; and
   turn signal disable means for inhibiting said driver means from activating said at least one warning indicator when either or both of said turn signals are active.

9. An underspeed warning system as in claim 8 wherein said means for providing a reference speed signal comprises a reference speed switch for alternately selecting said reference speed signal from two or more predetermined reference speed signals.

10. An underspeed warning system as in claim 8, further comprising:
    a reset switch; and
    latch means for inhibiting said driver means from activating said at least one warning indicator until said overspeed signal is output from said comparator means after the last activation of said reset switch.

11. An underspeed warning system as in claim 10, wherein said latch means comprises a NAND latch comprising a pair of NAND gates.

12. An underspeed warning system for a motor vehicle having left and right turn signals and including a circuit for producing a direct DC speed signal proportional to the speed of the vehicle, said warning system comprising:
    means for providing a reference speed signal;
    comparator means for comparing said direct DC speed signal to said reference speed signal and providing a underspeed signal when said direct DC speed signal is less than said reference speed signal and an overspeed signal when said direct DC speed signal is greater than said reference speed signal;
    at least one warning indicator;
    driver means for activating said at least one warning indicator in response to said underspeed signal;
    a reset switch; and
    latch means for inhibiting said driver means from activating said at least one warning indicator until said overspeed signal is output from said comparator means after the last activation of said reset switch.

* * * * *